United States Patent [19]
Younkin

[11] 3,929,019
[45] Dec. 30, 1975

[54] PRESSURE TRANSDUCER

[75] Inventor: James R. Younkin, Fayetteville, Ark.

[73] Assignee: Edo - Aire Mitchell Industries, Inc., Mineral Wells, Tex.

[22] Filed: Mar. 25, 1974

[21] Appl. No.: 454,365

[52] U.S. Cl................... 73/398 C; 73/387; 73/410
[51] Int. Cl.²............................................ G01L 9/12
[58] Field of Search.......... 73/398 C, 387, 386, 410, 73/393, 384, 178 T; 318/645, 662, 676; 317/246; 244/77 D

[56] References Cited
UNITED STATES PATENTS

| | | | |
|---|---|---|---|
| 2,597,892 | 5/1952 | Nash | 73/386 |
| 2,825,227 | 3/1958 | Sandberg | 73/386 |

*Primary Examiner*—Donald O. Woodiel
*Attorney, Agent, or Firm*—Richards, Harris and Medlock

[57] ABSTRACT

Static pressure acting on an aneroid provides movement of a vane as part of a mechanical motion to electrical signal transducer generating an electrical signal varying with pressure. The aneroid is coupled to a set point adjustment through a ring gear as part of the transducer housing for establishing a particular pressure level about which changes are reflected in the output of the transducer. Changes in static pressure produce an electrical output signal from the motion transducer that is applied to a control loop including a servomotor driving a gear carried by a shaft coupled to the aneroid through a rotary-to-rectilinear converter. Excitation of the servomotor repositions the vane attached to the aneroid with respect to the motion transducer to reestablish a balance in the transducer output signal. The motion transducer includes two variable capacitors with the vane positionable therebetween to change the capacitance of the two capacitors differentially. A differential-to-single ended converter having two inputs each connected to one of the variable capacitors generates an error signal varying with the capacitor difference.

28 Claims, 6 Drawing Figures

PRESSURE TRANSDUCER

This invention relates to a pressure transducer and more particularly to a pressure transducer providing an output signal directly from movement of a pressure responsive means.

Heretofore, various devices for generating a pressure dependent signal have been provided. However, many of these arrangements furnishing such signals, which is effective and practical, have been of a complicated and expensive construction and accordingly are not suitable for small general utility applications, such as general aviation aircraft. Many such devices are difficult to install thereby making servicing difficult and reliability of the device is sacrificed. On the other hand, prior art systems of a simple construction have not provided a satisfactory method of responding to a change in pressure, e.g., a change in aircraft altitude, to provide an accurate pressure related signal.

One application of the present invention is in aircraft control, such as an altimeter or altitude hold system. Altitude pressure responsive devices of the type to which the present invention relates usually consist of a housing containing pressure responsive means expansible and contractible in accordance with changes in ambient atmosphere, and a signal generator operable thereby. Some provision is made between the pressure responsive means and the generator to seal the latter from the ambient atmosphere affecting the pressure responsive means. One manner of sealing consists in the provision of a metal bellows rockable by the pressure responsive means through a linkage arrangement located at one side of the bellows to transmit such motion to the generator through a second linkage arrangement located the other side of the bellows. Such a linkage arrangement has been found undesirable because the linkages include an undue number of moving parts which are subject to wear and consequently affect the operation of the system.

Other altitude pressure responsive devices have a chamber for the pressure responsive means which is separated and sealed from a second chamber containing the signal generator and other operating parts. Although this eliminates the need of a mechanical connection, the signal generator must operate through the seal to maintain isolation from the chamber containing the pressure responsive means. Such an alternative is likewise undesirable because of the loose coupling required between parts of the signal generator on opposite sides of the seal. This further increases the power requirements of the device.

The pressure transducer of the present invention utilizes a pressure responsive means with a pickoff vane positioned in close proximity to a plurality of capacitor plates located approximate to the pickoff vane. The capacitor plates are electrically 180° out of phase with respect to each other, i.e., when one capacitor plate and a reference plate is positioned to provide a maximum signal, the other capacitor plate is positioned with respect to the reference plate to provide a minimum signal. Thus, there is a direct coupling between the pressure responsive means and a signal generator without the need for complicated linkages or pickoffs operating through a seal. Further, the capacitor pickoff requires only a minimum amount of power to provide a signal varying with the differential capacitance between the capacitor plates and a reference plate.

Capacitor pickoffs are not broadly new in the art. They have been used under a wide variety of conditions to measure extremely high as well as low differential pressures.

A few of these capacitor pickoffs have been designed with complex adjusting mechanisms in an attempt to provide a set point level. None of these prior devices use a simple, inexpensive and dependable set point adjustment as disclosed herein for a pressure responsive means. A translational shaft is coupled to an aneroid and extends through a bellows seal to a rotational shaft. The bellows has one end secured to a frame and the other end secured to the aneroid. The bellows prevent rotational movement of the translation shaft and biases the shaft with reference to the frame.

In accordance with the present invention, a pressure transducer includes a frame with one end of a bellows secured thereto. An aneroid element is secured at one side thereof to the movable end of the bellows with its sensitive axis coaxial to the axis of the bellows and bodily movable with the movable end. An actuator is fixed to the movable end of the bellows at the aneroid element and extends through the bellows. Coupled to the actuator is a control means that rotates relative to the frame to impart rectilinear movement to the movable end of the bellows along the sensitive axis of the aneroid element. Responsive to movement, the free end of the aneroid element relative to the frame is a pickoff that provides an output signal varying with pressure acting on the aneroid element.

In accordance with a more specific embodiment of the present invention, an altimeter includes a capsule housing having a chamber open to static pressure through a passageway and including a bore into the chamber. A translational shaft is mounted in the bore and extends from an end within the chamber to an end external of the chamber. Coupled to the end of the translational shaft in the chamber is a pressure responsive means, such as an aneroid. Fastened to the capsule housing around the passageway and to the translational shaft is a bellows that provides a seal and also prevents rotational movement of the shaft. A motion pickoff responds to a movement of the pressure responsive means to provide an output signal varying with the motion thereof. The position of the pressure responsive means with respect to the pickoff is adjusted by imparting translational motion to the shaft.

In accordance with a more specific embodiment of the invention, the pickoff includes two variable capacitors with a vane coupled to the pressure responsive means positionable therebetween to change the capacitance thereof differentially. A differential-to-single ended converter having two inputs each connected to one of the variable capacitors generates an error signal varying with the capacitor difference.

A more complete understanding of the invention and its advantages will be apparent from the specification and claims and from the accompanying drawings illustrative of the invention.

Referring to the drawings.

Although the present invention will be described with reference to an altimeter, it should be understood that it generally relates to a pressure transducer for other applications.

Figure 1:
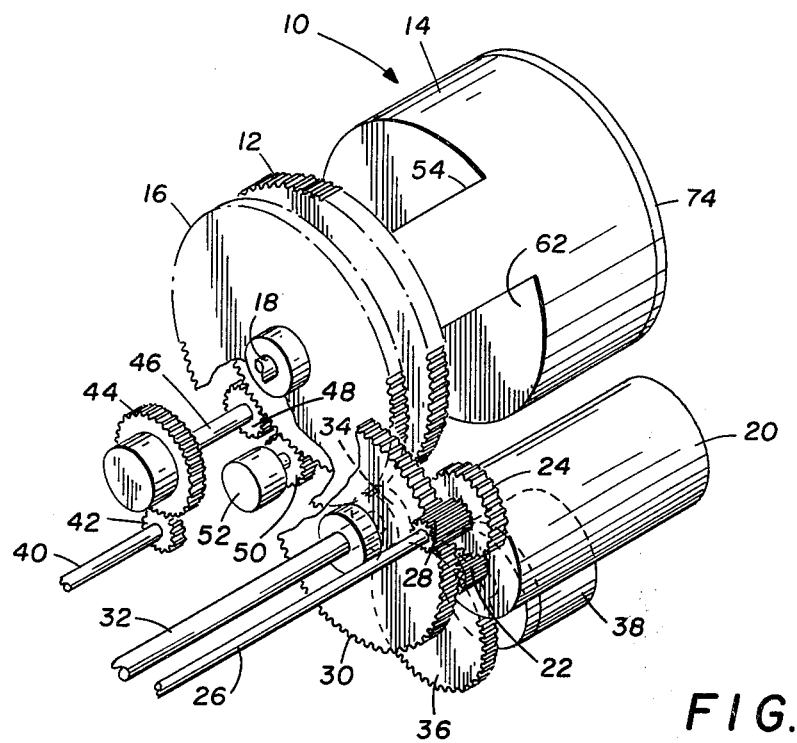
FIG. 1 is a pictorial of an altimeter in accordance with the present invention including a set point adjusting gear train and a servomotor feedback.

Referring to FIG. 1, there is shown an altitude responsive system of the type utilized in a flight instrument as described in the copending application of James R. Younkin, filed Mar. 25, 1975, Ser. No. 454,305 . The pressure responsive system includes an altimeter 10 having a ring gear 12 as part of an altimeter housing 14. A drive gear 16 mounted to a rotational shaft 18 also comprises part of the altimeter 10.

The drive gear 16 is driven by a servomotor 20 coupled to an altitude control system, to be described with reference to FIG. 4. On the output shaft of the servomotor 20 there is mounted a spur gear 22 that engages a drive gear 24 mounted on a shaft 26 that drives a digital display, not shown. Also mounted on the shaft 26 is a spur gear 28 engaging a drive gear 30 mounted on a shaft 32. The shaft 32 also drives an aircraft altitude indicator. Also driven by the drive gear 30 is an idler gear 34 engaging the drive gear 16 and in engagement with a drive gear 36 coupled to the shaft of a potentiometer 38. The potentiometer 38 is a part of the altitude control system of the copending application of James R. Younkin.

Energization of the altitude servomotor 20 by a signal from the altitude control system causes the drive gear 16 to rotate the shaft 18 of the altimeter 10. A signal to the servomotor 20 also rotates the shafts 26 and 32 to drive altitude indicating displays.

As an aircraft covers a given course the pressure at ground level changes due to local atmospheric conditions. To reference the altimeter 10 to a particular ground level pressure, an adjusting knob (not shown) couples to a drive shaft 40 on which is mounted a spur gear 42 engaging a drive gear 44 mounted on a shaft 46. A spur gear 48 is also mounted on the shaft 46 and engages the ring gear 12 coupled to the housing 14 of the altimeter 10. Thus, the housing 10 is rotatably mounted with respect to the shaft 18 to adjust the indicated altitude set point of the altimeter. This establishes a predetermined relationship between a pickoff and an aneroid, to be described, of the altimeter 10.

Also rotating with the ring gear 12 is a spur gear 50 coupled to the wiper arm of the potentiometer 52 as part of a compensation network for the altimeter 10, as described in the copending application of James R. Younkin.

Figure 2:
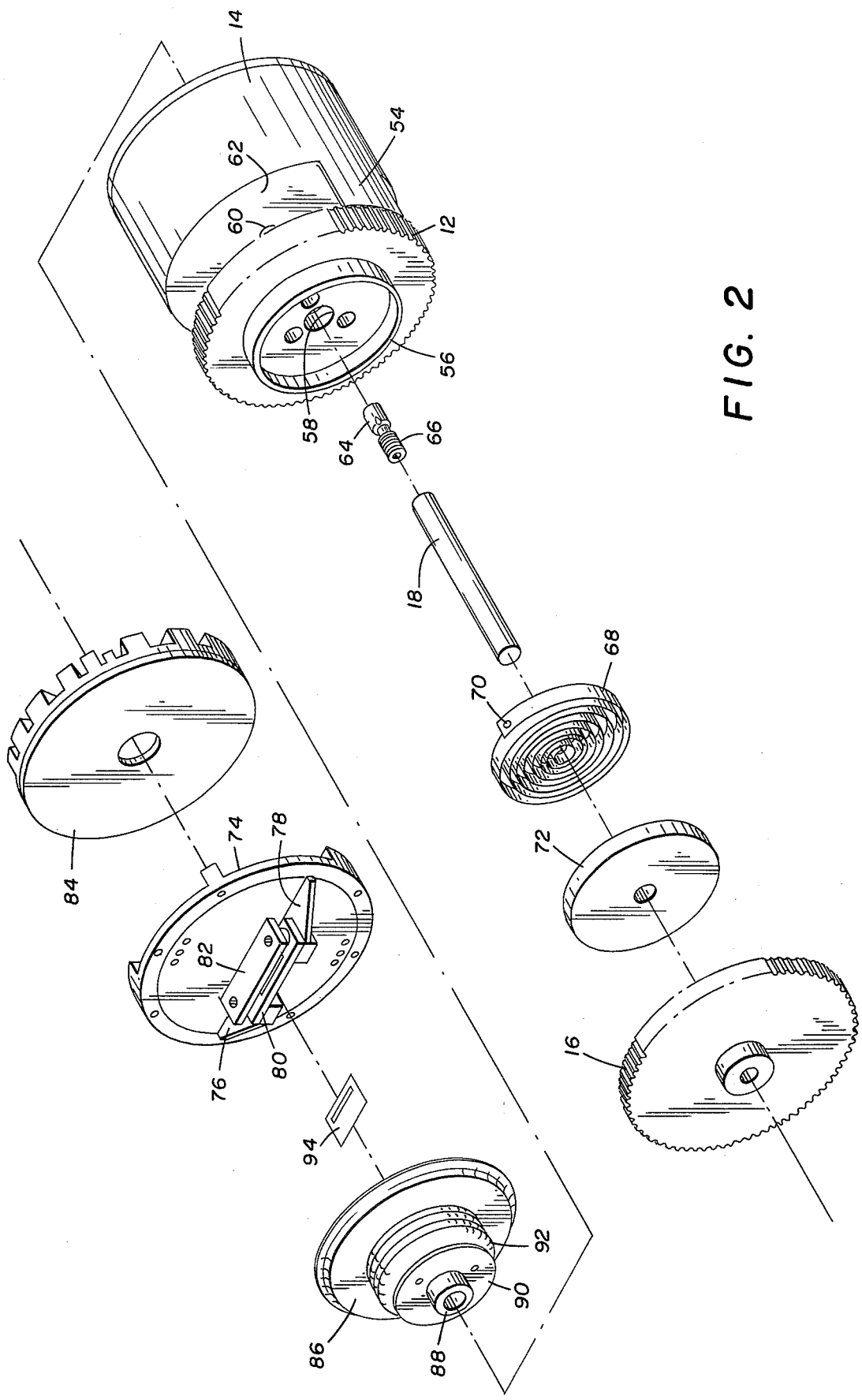
FIG. 2 is an exploded view of the altimeter of FIG. 1 removed from the set point geat train and the servomotor feedback.

Referring to FIG. 2, there is shown an exploded view of the altimeter 10 including a cylindrical capsule housing 14 with two axially extending sectors 54 (only one shown) supporting the ring gear 12. Affixed to the front face of the ring gear 12 is a spring enclosure 56. At the center of the ring gear 12 there is an opening 58 axially aligned with a bore 60 through the front plate 62 of the housing 14. Assembled through the opening 58 and the bore 60 is the rotational shaft 18 and a translational shaft 64. The translational shaft 64 has one end extending into the housing 14 and a second end having an externally threaded section 66 external of the housing and engaging an internally threaded section (not shown) of the rotational shaft 18.

Attached to the rotational shaft 18 is a bias spring 68 having a free end 70 connected to the spring housing 56. Enclosing the spring 68 within the housing 56 is a spring cover 72 also mounted to rotate with the rotational shaft 18. By means of the spring 68, a torque is generated on the shaft 18 in a given direction to remove backlash between the shaft and the gearing from the servomotor 20 and the drive gear 16.

Enclosing the housing 14 opposite the front plate 62 is an end cap 74 having formed integral therewith mounting brackets 76 and 78. Supported on the brackets 76 and 78 is a printed circuit board 80 spaced from a printed circuit board 82 both as part of a pickoff, to be described.

Secured to the end cap 74 external of the housing 14 is a printed circuit board 84 having circuitry connected to components on the printed circuit boards 80 and 82 as part of a signal generator, to be described.

Within the housing 14 there is mounted on the end of the translational shaft 64 an aneroid 86 as part of a pressure responsive device. The shaft 64 extends through a bushing 88 terminating in a flange 90 bolted or otherwise mounted to the innerface of the front plate 62.

Connected at one end to the flange 90 and at the other end to the aneroid 86 (along a sensitive axis) is a bellows 92 to provide a seal around the shaft 64 to isolate a chamber within the housing 14 from ambient atmosphere. The bellows 92, in addition to providing a seal, also prevents rotational motion of the translational shaft 64. In addition, the bellows 92 exerts a spring force on the shaft 64 in a direction away from the shaft 18.

Also connected to the aneroid 86 along its sensitive axis is a vane 94 that extends between the printed circuit boards 80 and 82 to form a movable element of a differential capacitor pickoff.

Figure 3:
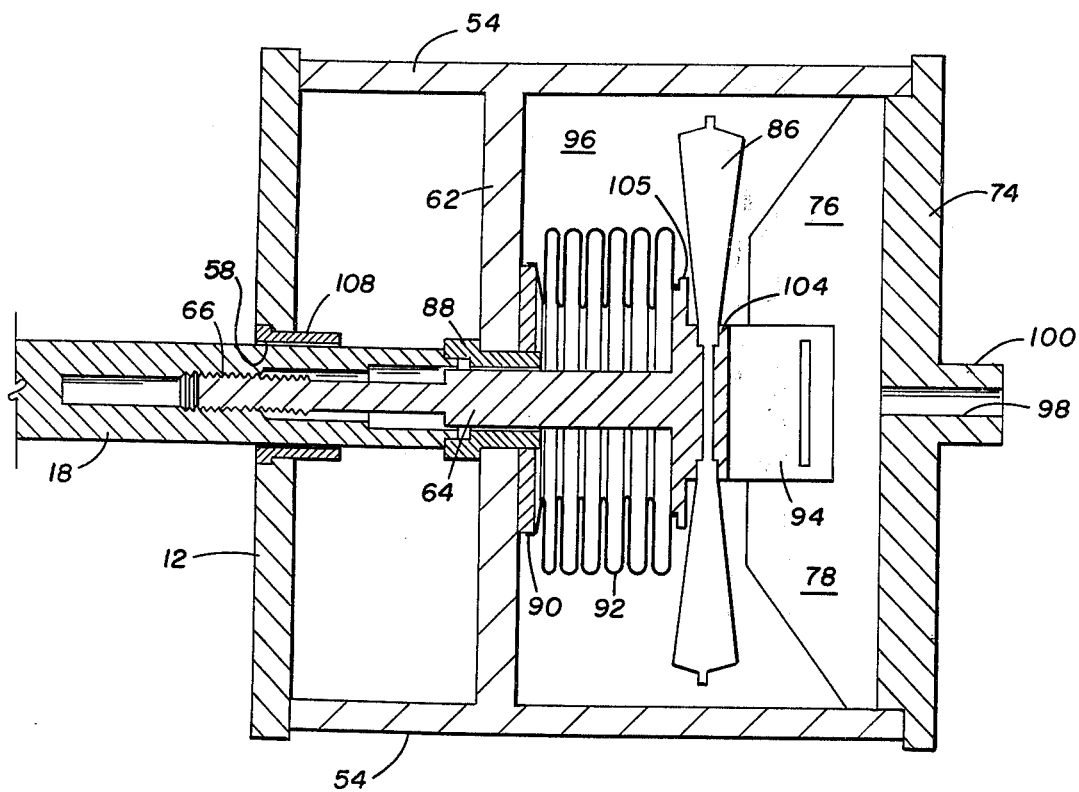
FIG. 3 is a section through the altimeter of FIG. 1 showing the assembly of an aneroid with a translational shaft and further showing a vane positionable by response of the aneroid to a static pressure change.

Referring to FIG. 3, there is shown a sectional view of the altimeter 10 with the various components assembled into the housing 14. Within the housing 14 there is formed a chamber 96 with the end cap 74 enclosing one end thereof. The end cap is secured to the housing 14 in such a manner as to provide an air seal at the junction of the housing and the end cap. Extending through the end cap 74 is a passageway 98 terminating at an adapter 100 for connecting to a conduit open to static air pressure to be measured.

When the end cap 74 is assembled to the housing 14 to form the chamber 96 the mounting brackets 76 and 78 position the printed circuit boards 80 and 82 such that the vane 94 extends between the circuit boards. The vane 94 is attached to the aneroid 86 by means of a mounting button 104. Opposite the mounting button 104 a mounting button 105 extends from the innermost end of the translational shaft 64. Thus, the aneroid 86 is mounted to the shaft 64 between mounting button 105, extending from the end of the shaft 64, and mounting button 104 attached to the vane 94 in an axial alignment with the shaft 64 all on the sensitive axis of the aneroid 86.

Also secured to the mounting button 105 around the periphery thereof is the bellows 92 that has the opposite end secured to the flange 90. The flange 90 is a part of the bushing 88 extending through the front plate 62 of the housing 14. With the bellows 92 secured to the mounting button 105 and the flange 90, an air seal is provided around the shaft 64. The bellows 92 provides a flexible means of sealing the shaft 64 and also prevents rotational movement of the shaft 64 and the aneroid 86 with respect to the housing 14. By means of the bellows 92 the shaft 64 is then constrained to translational movement.

As shown in FIG. 3, the translational shaft 64 extends into the rotational shaft 18 with the externally threaded section 66 engaging an internally threaded section of the shaft 18. The rotational shaft 18 extends through a bushing 108 in the opening 58 of the ring gear 12 to a collar in the bushing 88. The bellows 92 biases the rotational shaft 18 against the shoulder of the bushing 88 to establish a reference between the shaft 18 and the housing 14. This is the third feature of the bellows 92 as explained previously.

Energizing the servomotor 20 rotates the drive gear 16 through the gear train shown in FIG. 1 to thereby rotate the shaft 18. Rotating the shaft 18 causes the threaded section 66 to have an axial movement with relation to the shaft 18 thereby providing translational motion to the shaft 64, which, as explained, is constrained to translational motion by the bellows 92. The result is a rotary-to-rectilinear conversion. With the housing 14 fixed in position, imparting a translational motion to the shaft 64 varies the position of the vane 94 with relation to the printed circuit boards 80 and 82. This changes the pickoff voltage generated from the altimeter, to be described.

As mentioned previously, as an aircraft covers a given course the altimeter must be referenced to ground level. This adjustment is provided through the gear train of FIG. 1 by rotation of the shaft 40. Rotating the shaft 40 produces a rotation of the housing 14 by means of the ring gear 12. Rotating the housing 14 causes the translational shaft 64 to also rotate through the same angular motion by means of the constraint of the bellows 92. The shaft 18 is fixed in position by means of the servomotor 20 and the external threaded section 66 moves linearly with respect to the shaft 18. This is a similar motion to that described previously upon energization of the servomotor 20 to cause the vane 94 to move with relation to the printed circuit boards 80 and 82. Thus, an initial set point voltage is established from a pickoff generator of the altimeter.

Figure 4:
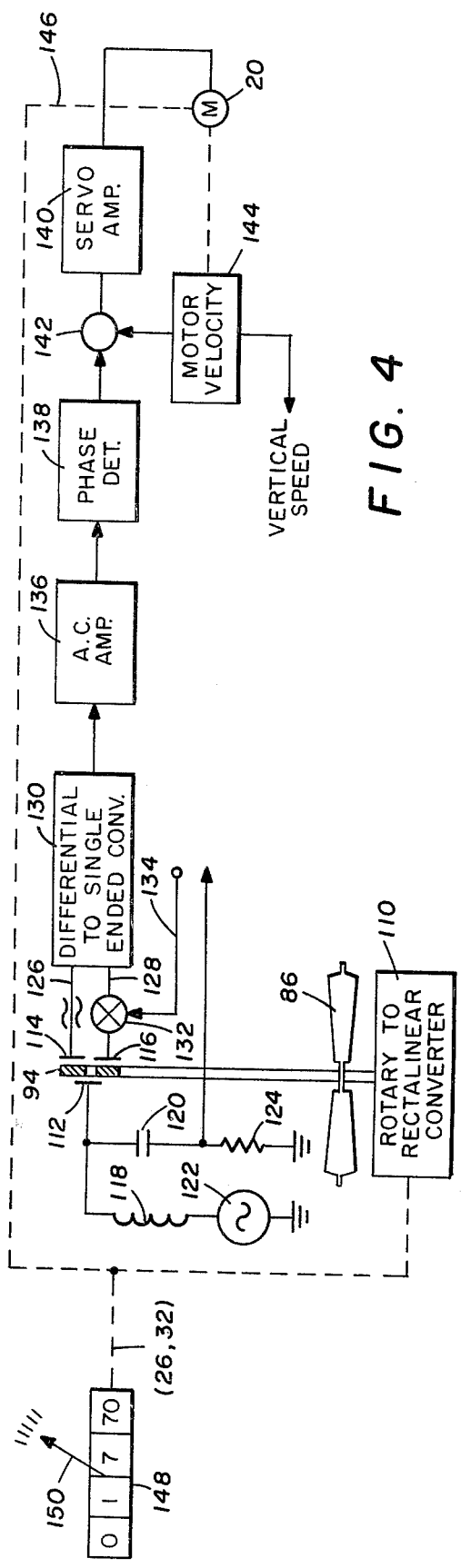
FIG. 4 is a block diagram of an altitude indicator system for use with the altimeter of FIG. 1, here shown schematically.

Referring to FIG. 4, there is shown a block diagram of a control system for the servomotor 20 including the signal generator of the altimeter 10 responsive to movement of the vane 94. A rotary-to-rectilinear converter 110 (comprising generally the rotational shaft 18, the translational shaft 64 and the bellows 92) is coupled to the aneroid 86 that positions the vane 94 between the printed circuit boards 80 and 82.

Basically, the capacitor pickoff comprises two capacitors including a reference plate 112 mounted on the printed circuit board 80 and capacitor plates 114 and 116 mounted on the printed circuit board 82. The reference plate 112 is connected across an LC network (inductor 118 and capacitor 120) that is driven by a voltage source 122 producing a square wave output typically at 20,000 Hz. Because the LC network is resonant at its excitation frequency, the reference plate 112 is excited by a high voltage sine wave. The capacitor 120 of the LC network is coupled to ground through a current sampling resistor 124.

A change in pressure on the aneroid 86 displaces the vane 94 between the reference plate 112 and the capacitor plates 114 and 116 to produce a differential voltage signal on lines 126 and 128 applied to inputs of a differential-to-single ended converter 130. An output of the converter 130 is a voltage varying with the difference between the signals on the lines 126 and 128. Note, that the line 128 is connected between a summing junction 132 and the input to the converter 130. The input to the summing junction on the line 134 is a compensating signal as described in the copending application of James R. Younkin. Aneroids are known to provide a nonlinear displacement with altitude and must be compensated to provide energization of the servomotor 20 to give an accurate reading at the altitude indicator 148 and the analog pointer 150. This compensation is provided by means of an electronic compensation network connected to the line 134.

The output of the converter 130 is amplified in an AC amplifier 136 and the signal phase is detected in a phase detector 138. An output voltage from the phase detector 138 varies with the position of the vane 94 and is thus related to a pressure change exerted on the aneroid 86.

The output of the detector 138 is coupled to the input of a servoamplifier 140 through a summing junction 142. The servoamplifier 140 provides an output to drive the servomotor 20 that has a mechanical connection to a velocity generator 144. An output signal generated by the velocity generator 144 provides a feedback voltage to the summing junction 142 to complete the servoloop for the motor 20. A second output signal from the generator 144 is a vertical speed signal coupled to the autopilot of an aircraft.

Mechanically coupled to the output shaft of the servomotor 20 is the gear train of FIG. 1 represented by the dashed line 146 that drives a digital altitude indicator 148 and an analog pointer 150 through the connecting shafts 26 and 32. In addition, the gear train represented by the dashed line 146 drives the rotary-to-rectilinear converter 110 as part of the altimeter 10 for positioning the aneroid 86 as explained.

By means of the mechanical connection between the servomotor 20 and the converter 110, a displacement of the vane 94 by means of a pressure change on the aneroid 86 causes the converter 110 to reposition the aneroid and the vane to return the latter to a null position.

Figure 5:
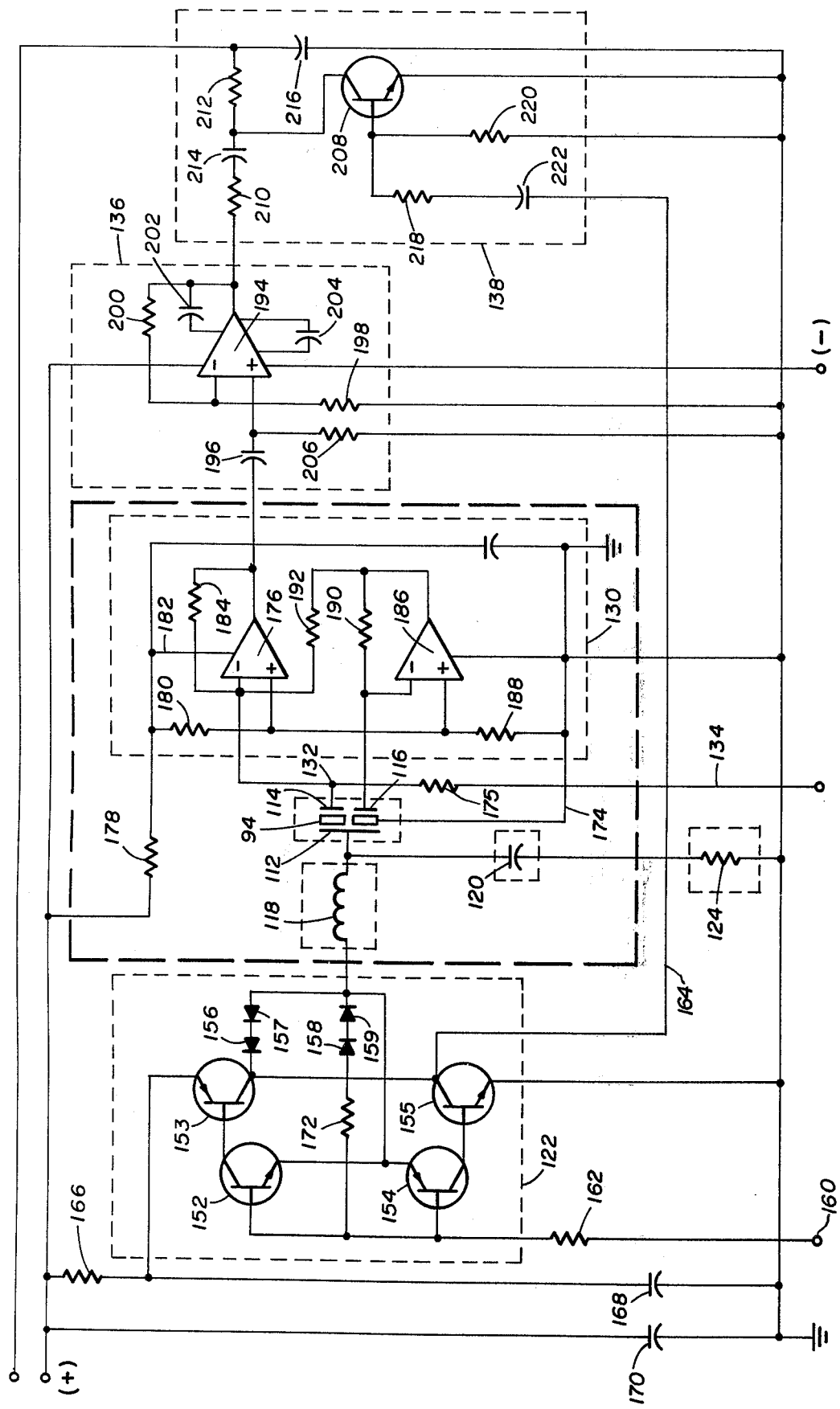
FIG. 5 is a schematic of the block diagram of FIG. 4 through the phase differential detector.

Referring to FIG. 5, there is shown a schematic of the electronics on the printed circuit boards 80, 82 and 84. The supply source 122 includes transistors 152–155 with the emitter electrode of the transistors 152 and 154 interconnected to a diode array consisting of diodes 156–159. The base electrodes of the transistors 152 and 154 are also interconnected and supply a base drive voltage applied to a terminal 160 through a resistor 162. Also connected to the terminal 160 is the diode 158 through a resistor 172.

The transistors 153 and 155 have a common collector connection to a line 164 supplying a phase reference signal to the phase detector 138. A supply voltage is applied to the transistor 153 at a junction between a resistor 166 and a capacitor 168. A filter capacitor 170 is connected in parallel with the series interconnection of the resistor 166 and the capacitor 168.

An output voltage from the source 122 is generated at the interconnection of the diodes 157 and 159 and applied to the inductor 118 having a second terminal connected to the reference plate 112. Also connected to the second terminal of the inductor 118 is the capacitor 120. In series with the capacitor 120 is the resistor 124 connected to ground.

In the pickoff associated with the aneroid 86, the vane 94 is connected to ground by means of a line 174. The capacitor plate 114 is connected to the line 134 through a resistor 175 and the inverting input of a differential amplifier 176 as part of the converter 130. The noninverting input of the amplifier 176 is connected to the positive terminal of a DC supply through resistors 178 and 180 as part of a divider network including a resistor 188. The amplifier 176 is provided with a supply voltage generated at the junction of the resistors 178 and 180 by an interconnection including a line 182. At the output terminal of the amplifier 176 there is connected a feedback resistor 184 also connected to the inverting input terminal.

The capacitor plate 116 is connected to the inverting input of an amplifier 186 with the noninverting input of the amplifier connected to the junction of resistors 180 and 188. At the output terminal of an amplifier 186 there is connected a feedback resistor 190 that returns the output voltage to the inverting input terminal. In addition, a resistor 192 is connected between the output terminal of the amplifier 186 and the inverting input terminal of the differential amplifier 176.

If the voltage at the capacitor plate 116 is identified as $E_1$, then the output voltage of the amplifier 186 is equal to $KE_1$ and this voltage is summed with the voltage $E_2$ at the capacitor plate 114 at the inverting input terminal of the amplifier 176. This produces a voltage $E_o$ at the output of the amplifier 176 that varies in accordance with the expression $E_o = KE_2 + KE_1$, where $K_1$ and $K_2$ are gain factors determined by the value of the feedback resistors. Thus, the capacitance differential between the plates 114 and 116 generates a single ended voltage at the output of the amplifier 176 that is connected to an input of the amplifier 136.

The amplifier 136 includes a differential amplifier 194 having the noninverting input connected to the amplifier 176 through a coupling capacitor 196. The input signal to the noninverting input of the amplifier 194 is provided at the junction of the capacitor 196 and a resistor 206 connected to ground. The inverting input of the differential amplifier 194 is connected to ground through a resistor 198 and also to a feedback network including a resistor 200. Included in the feedback network for the amplifier 194 are capacitors 202 and 204.

An output signal from the differential amplifier 194 is applied to the phase detector 138 that includes a transistor 208 with a collector electrode connection to a circuit including resistors 210 and 212 in series with a capacitor 214. The output signal from the phase detector 138 is provided at the junction of the resistor 212 and a capacitor 216 connected to ground. The phase reference signal to the detector 138 from the transistors 153 and 155 is applied to the base electrode of the transistor 208 through a base drive network including resistors 218 and 220 with a capacitor 222 in series with the resistor 218.

With reference to FIG. 5, the circuitry within the heavy dotted line is assembled on the printed circuit boards 80 and 82 and the remaining circuitry is assembled on the printed circuit board 84. Additional circuitry for a flight instrument may also be assembled on the printed circuit board 84.

Figure 6:
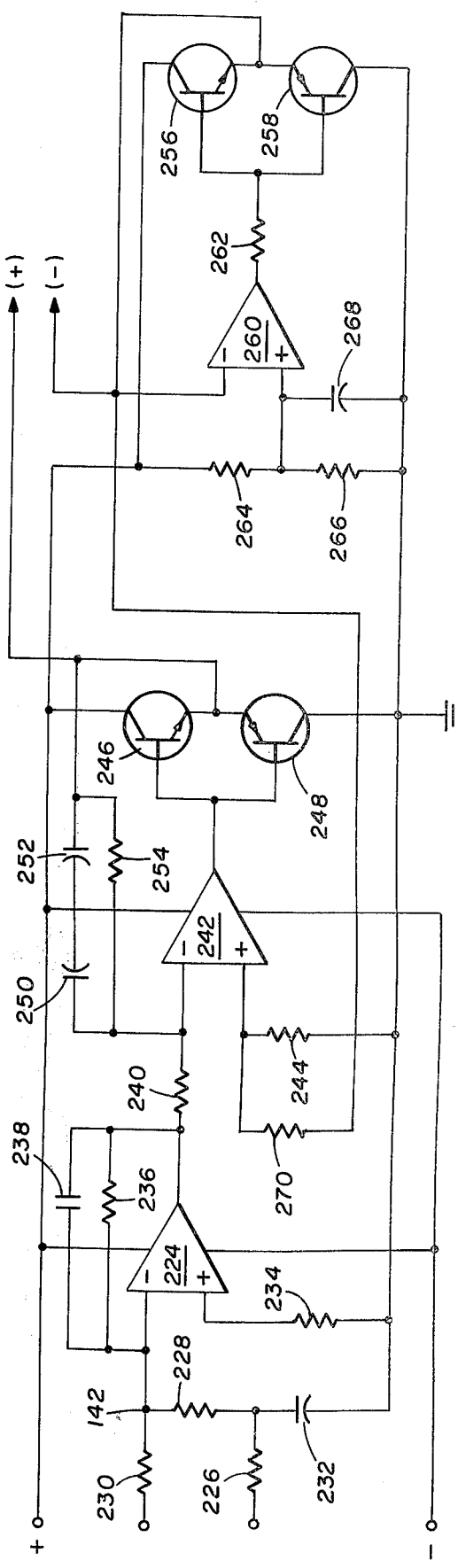
FIG. 6 is a schematic of the servoamplifier of FIG. 4.

Referring to FIG. 6, there is shown a schematic of the servoamplifier 140 for driving the servomotor 20. An output from the phase detector at the junction of the resistor 212 and the capacitor 216 is applied to the inverting input of a differential amplifier 224 through resistors 226 and 228. Also tied to the inverting input of the amplifier 224 is a resistor 230 connected to the output of the velocity generator 144. Thus, the junction between the resistors 228 and 230 comprises the summing junction 142. Included as part of the input circuit to the amplifier 224 at the inverting terminal is a capacitor 232. The noninverting input of the amplifier 224 is biased above ground through a resistor 234.

The output terminal of the amplifier 224 is connected to a feedback network including a resistor 236 in parallel with a capacitor 238. Also connected to the output terminal of the amplifier 224 is a resistor 240 in a line to the inverting input of a differential amplifier 242. The noninverting input of the amplifier 242 is connected to a resistor 244 having a second terminal to ground.

The output of the differential amplifier 242 connects to the base electrode of transistors 246 and 248 in a push-pull connection. Connected to the common emitter of the transistors 246 and 248 is a feedback loop including series capacitors 250 and 252 in parallel with a resistor 254. A voltage occurring at the common emitter connection between the transistors 246 and 248 is the positive phase voltage to the servomotor 20.

The negative phase voltage to the servomotor 20 is generated at the common emitter connection of transistors 256 and 258. Both the transistors 256 and 258 are driven by a base voltage generated at the output of a differential amplifier 260 through a resistor 262. The noninverting input of the amplifier 260 is connected to a fixed voltage at the interconnection of resistors 264 and 266. Also forming a part of the input circuit to the noninverting terminal of the amplifier 260 is a capacitor 268. Connected to the inverting input of the amplifier 260 is the output signal generated between the common emitter connection of the transistors 256 and 258. This signal is also applied through a feedback loop including a resistor 270 to the noninverting input of the amplifier 242.

The circuitry of FIG. 6 receives both the velocity speed signal and the phase detector output signal to drive the amplifiers 224 and 242 to provide the positive phase signal to the servomotor 20. The negative phase signal to the servomotor 20 is provided by the output of the transistors 256 and 258. The speed and direction of rotation of the servomotor 20 is thus determined by the differential between the velocity speed signal and the output of the phase detector 138. The motor continues to drive until the differential is reduced to zero.

While only one embodiment of the invention, together with various modifications thereof, has been described in detail herein and shown in the accompanying drawings, it will be evident that various further modifications are possible without departing from the scope of the invention.

What is claimed is:

1. A pressure transducer which comprises:
   a frame;
   a bellows secured at one end to said frame and having a movable end;
   an aneroid element having a free side and secured at the opposite side to the movable end of said bellows with the sensitive axis of said aneroid coaxial to an axis of said bellows and bodily movable with the movable end;

actuation means fixed to the movable end of said bellows and extending through said bellows;

control means coupled to said actuation means and rotational relative to said frame to impart rectilinear movement to the movable end of said bellows along the sensitive axis to said aneroid element; and pickoff means coupled to the free side of said aneroid element along the sensitive axis and responsive to movement on the free side of said aneroid element relative to said frame.

2. A pressure transducer as set forth in claim 1 wherein said control means has a fixed spatial relation relative to said frame.

3. A pressure transducer as set forth in claim 1 wherein said bellows biases said control means into a fixed spatial relation relative to said frame.

4. A pressure transducer at set forth in claim 1 wherein said actuation means includes a translational shaft having a threaded section external of said bellows and said control means includes:

a rotational shaft having a threaded section engaging the threaded section of the translational shaft and having one end fixed in position relative to said frame by said bellows.

5. A pressure transducer as set forth in claim 4 including a spring connected to said rotational shaft and to said frame to impart a predetermined torque to the rotational shaft.

6. A pressure transducer as set forth in claim 1 wherein said pickoff means includes:

a vane attached to said aneroid element and movable with the free end side thereof; and a mechanical motion to electrical signal transducer responsive to the movement of said vane to provide an electrical output signal varying with the vane movement.

7. A pressure transducer as set forth in claim 6 wherein said mechanical motion to electrical signal transducer includes:

two variable capacitors with said vane positionable therebetween to change the capacitance thereof differentially; and a differential-to-single ended converter having two inputs each connected to one of said variable capacitors and generating a signal varying with the capacitor difference.

8. A pressure transducer as set forth in claim 7 wherein said differential-to-single ended converter includes:

a first amplifier having an input coupled to one of said variable capacitors and an output varying with the capacitance thereof;

a second amplifier having an input coupled to the second of said variable capacitors; and circuit means for connecting the output of the first amplifier to the input of the second amplifier to thereby cause the second amplifier output to vary with the difference in capacitance between the two variable capacitors.

9. A pressure transducer, comprising in combination:

a capsule housing having a chamber open to static pressure and including a bore into the chamber;

a translational shaft mounted in the bore and extending from an end within the chamber to an end external of the chamber;

pressure responsive means coupled along a sensitive axis to the end of said shaft in the chamber of said housing;

a bellows secured at one end to the capsule housing around the bore and having a movable end secured to said shaft to provide a flexible seal and prevent rotational movement of the shaft;

a pickoff coupled to said pressure responsive means and responsive to a movement of said pressure responsive means along the sensitive axis to provide an output signal varying with the motion of said pressure responsive means relative to said housing; and means coupled to said translational shaft for imparting translational motion to said shaft to adjust the position of said pressure responsive means with respect to said housing.

10. A pressure transducer as set forth in claim 9 wherein said bellows biases said translational shaft into a fixed spatial relation relative to said housing.

11. A pressure transducer as set forth in claim 9 wherein said translational shaft includes a threaded section external of the chamber of said housing and said means for imparting translational motion includes:

a rotational shaft having a threaded section engaging the threaded section of the translational shaft and having one end fixed in position relative to said housing by said bellows; and means for imparting rotational motion to said rotational shaft.

12. A pressure transducer as set forth in claim 11 including a spring connected to said rotational shaft and to said housing to apply a predetermined torque to the rotational shaft relative to said housing.

13. An altimeter, comprising in combination:

a capsule housing having a chamber open to static pressure and including a bore into the chamber;

a translational shaft mounted in the bore and extending from an end within the chamber to an end external of the chamber;

an aneroid having a free side and coupled along a sensitive axis to the end of said shaft in the chamber of said housing;

a bellows secured at one end to the capsule housing around the bore and having a movable end secured to the one end of said translational shaft within the chamber to provide a flexible seal and prevent rotational movement of the shaft with respect to the housing;

a motion transducer coupled to said aneroid and responsive to a composite movement of said aneroid and said translational shaft to provide an output signal varying with the free side motion of said aneroid relative too said housing;

means coupled to said translational shaft for imparting translational motion to said shaft to adjust the position of the free side of said aneroid with respect to said housing; and means coupled to said housing for positioning said housing with respect to the free side of said aneroid.

14. An altimeter as set forth in claim 13 including a controller responsive to the output signal of said motion transducer to actuate said means for imparting translational motion to maintain a preestablished relation between the free end of said aneroid and said housing.

15. An altimeter as set forth in claim 13 wherein said translational shaft includes a threaded section external of the chamber of said housing, and said means for imparting translational motion includes:
- a rotational shaft having a threaded section engaging the threaded section of the translational shaft and having one end fixed in position relative to said housing by said bellows; and
- means for imparting rotational motion to said rotational shaft.

16. An altimeter as set forth in claim 15 wherein said means for imparting rotational motion includes a drive gear mounted to the rotational shaft and further including a controller responsive to the output signal of said motion transducer and providing a signal to a servomotor having an output gear engaging the drive gear.

17. An altimeter as set forth in claim 16 wherein said means for positioning includes a drive gear fixed to said housing.

18. An altimeter, comprising in combination:
- a capsule housing having a chamber opened to atmospheric pressure and including a bore into the chamber;
- a translational shaft mounted through the bore and extending from an end within the chamber to an end external of the chamber;
- an aneroid having a free end and coupled along a sensitive axis to the end of said shaft in the chamber of said housing;
- a bellows secured at one end to the capsule housing around the bore and having a movable end secured to said bellows to provide a flexible seal and prevent rotational movement of the shaft with respect to said housing;
- a vane attaching the free side to said aneroid and movable therewith;
- a mechanical motion to electrical signal transducer responsive to the composite movement of said vane and the translational shaft to provide an electrical output signal varying with the vane movement relative to said housing; and
- means coupled to said translational shaft for imparting translational motion to said shaft to adjust the position of said aneroid with respect to said housing.

19. An altimeter as set forth in claim 18 wherein said motion transducer includes:
- two variable capacitors with said vane positionable therebetween to change the capacitance thereof differentially; and
- a differential-to-single ended converter having two inputs each connected to one of said variable capacitors and generating an error signal varying with the capacitor difference.

20. An altimeter as set forth in claim 19 wherein said differential-to-single ended converter includes:
- a first amplifier having an input coupled to one of said variable capacitors and an output varying with the capacitance thereof;
- a second amplifier having an input coupled to the second of said variable capacitors; and
- circuit means for connecting the output of the first amplifier to the input of the second amplifier to thereby cause the second amplifier output to vary with the difference in capacitance between the two variable capacitors.

21. An altimeter as set forth in claim 19 wherein said vane is attached to said aneroid on the free side along the sensitive axis thereof.

22. An altimeter as set forth in claim 21 wherein said housing includes an end cap displaced from said aneroid and said two variable capacitors are mounted to said end cap with said vane positionable therebetween.

23. An altimeter, comprising in combination:
- a capsule housing having a chamber opened to atmospheric pressure and including a bore into the chamber;
- a translational shaft mounted in the bore and extending from an end within the chamber to an end external of the chamber;
- an aneroid having a free side and coupled along a sensitive axis to the end of said shaft in the chamber of said housing;
- a bellows having one end in a sealing engagement with said aneroid and an opposite end in a sealing engagement with said housing around the bore to provide a flexible seal, prevent rotational movement of the shaft with respect to said housing, and provide an axial force on said translational shaft;
- a vane attached to the free side of said aneroid and movable therewith;
- a mechanical motion to electrical signal transducer responsive to the movement of said vane relative to said housing to provide an electrical output signal varying with the vane movement;
- means coupled to said translational shaft for imparting translational motion to said shaft to adjust the position of said aneroid with respect to said housing; and
- means coupled to said capsule housing for positioning said housing with respect to said translational shaft.

24. An altimeter as set forth in claim 23 including a controller responsive to the output signal of said motion transducer to actuate said means for imparting translational motion to maintain a preestablished relation between said vane and said housing.

25. An altimeter as set forth in claim 23 wherein said translational shaft includes a threaded section external of the chamber of said housing, and said means for imparting translational motion includes:
- a rotational shaft having a threaded section engaging the threaded section of the translational shaft and having one end fixed in position relative to said housing by said bellows; and
- means for imparting rotational motion to said rotational shaft.

26. An altimeter as set forth in claim 25 including a spring connected to said rotational shaft and to said housing to apply a predetermined torque to the rotational shaft relative to said housing.

27. A pressure transducer which comprises in combination:
- a frame;
- sealing means secured at one part to said frame and having a movable section;
- pressure responsive means coupled along a sensitive axis to the movable section of said sealing means and physically displaced with respect to said frame by the movement of the movable section;
- actuation means fixed to the movable section of said sealing means and extending through said frame to said sealing means;

control means coupled to said actuation means and rotational relative to said frame to impart rectilinear movement to the movable section of said sealing means along the sensitive axis of said pressure responsive means; and pickoff means coupled to said pressure responsive means and responsive to a movement thereof along the sensitive axis to provide an output signal varying with the motion of said pressure responsive means relative to said frame.

28. A pressure transducer, comprising in combination:

a capsule housing having a chamber open to static pressure and including a bore into the chamber;

a translational shaft mounted in the bore and extending from an end within the chamber to an end external of the chamber;

pressure responsive means coupled along a sensitive axis to the end of said shaft in the chamber of said housing;

sealing means secured at one part to the capsule housing around the bore to form the chamber therein open to static pressure and having a movable portion secured to said shaft to provide a flexible seal and prevent rotational movement of the shaft;

a pickoff coupled to said pressure responsive means and responsive to a movement of said means along the sensitive axis to provide an output signal varying with the motion of said pressure responsive means relative to said housing; and means coupled to said translational shaft for imparting translational motion to said shaft to adjust the position of said pressure responsive means with respect to said housing.

* * * * *